United States Patent
Long (10) Patent No.: US 9,488,544 B2
(45) Date of Patent: Nov. 8, 2016

(54) LOAD ESTIMATION SYSTEM FOR AERODYNAMIC STRUCTURES

(71) Applicant: The Boeing Company, Chicago, IL (US)

(72) Inventor: Kim Chenming Long, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 413 days.

(21) Appl. No.: 14/097,365

(22) Filed: Dec. 5, 2013

(65) Prior Publication Data

US 2016/0011073 A1  Jan. 14, 2016

(51) Int. Cl.
*B64D 45/00* (2006.01)
*G01M 5/00* (2006.01)

(52) U.S. Cl.
CPC ............ *G01M 5/0016* (2013.01); *B64D 45/00* (2013.01); *B64D 2045/0085* (2013.01)

(58) Field of Classification Search
CPC combination set(s) only.
See application file for complete search history.

(56) References Cited

U.S. PATENT DOCUMENTS

2006/0004499 A1  1/2006  Trego et al.
2009/0171634 A1  7/2009  Bensch et al.

OTHER PUBLICATIONS

Henrichfreise et al., "Estimation of Gusts and Structural Loads for Commercial Aircraft," International Forum on Aeroelasticity and Structural Dynamics, Jun. 2009, 11 pages.
Lee et al., "Short-Term Load Forecasting Using an Artificial Neural Network," Transactions on Power Systems, vol. 7, No. 1, Feb. 1992, pp. 124-132.
Chudy, "Response of a Light Aircraft Under Gust Loads," Czech Technical University Publishing House, Acta Polytechnica, vol. 44, No. 2, copyright 2004, pp. 97-102.
Cavagna et al., "FAST-GLD: a Fast Tool for the Prediction of Worst Case Gust Loads based on Neural Networks," 54th American Institute of Aeronautics and Astronautics Structures, Structural Dynamics, and Materials Conference, Apr. 2013, 13 pages.
Canadian Intellectual Property Office Examination Search Report, dated Nov. 4, 2015, regarding Application No. 2,862,382, 3 pages.
Extended European Search Report dated May 8, 2015, regarding Application No. EP14191462.2, 6 pages.
European Patent Office Communication, dated Mar. 30, 2016, regarding Application No. 14191462.2, 5 pages.

*Primary Examiner* — Thomas Tarcza
*Assistant Examiner* — Edward J Pipala
(74) *Attorney, Agent, or Firm* — Yee & Associates, P.C.

(57) ABSTRACT

A method and apparatus for identifying loads caused by wind. Information for a group of aircraft parameters recorded by an information recorder is received in an aircraft during operation of the aircraft. A number of loads on an aerodynamic structure of the aircraft is estimated using the information for the group of aircraft parameters.

17 Claims, 5 Drawing Sheets

LOAD ESTIMATION SYSTEM FOR AERODYNAMIC STRUCTURES

GOVERNMENT LICENSE RIGHTS

This application was made with United States Government support under contract number N00019-04-C-3146 awarded by the United States Department of Defense. The United States Government has certain rights in this application.

BACKGROUND INFORMATION

1. Field

The present disclosure relates generally to aircraft and, in particular, to managing aircraft. Still more particularly, the present disclosure relates to a method and apparatus for a load estimation system for aerodynamic structures in aircraft.

2. Background

An aircraft is subjected to many different loads during the operation of the aircraft. For example, loads may be applied to different portions of the aircraft during takeoff, flight, landing, and other phases of flight. Identifying these loads may aid in the design, inspection, and maintenance of the aircraft with respect to operating at desired levels of performance and safety.

For example, an aircraft may encounter loads caused by wind during flight. These loads will affect different portions of the aircraft. For instance, loads caused by wind may be placed on a wing, an airfoil structure, an outer skin, a fuselage, or some other portion of the aircraft.

The wind encountered by the aircraft may be different at different altitudes. As a result, the wind at the various altitudes may generate different levels of force on the aircraft.

Often, aircraft may encounter wind gusts during flight. A wind gust is a burst of wind which happens randomly. This wind may have a speed that exceeds the lowest winds measured during some interval by some amount. In other words, a wind gust may be a burst of wind with a speed higher than measured for that particular location at the condition specified in a day.

Wind encountered by the aircraft also may take the form of a microburst. A microburst is a localized column of sinking air that may generate divergent and straight-line winds. As another example, the wind may take the form of wind shear. The wind shear may have vertical and horizontal components that place loads on the aircraft.

Loads occurring from these and other types of wind may cause fatigue in an aircraft and result in inconsistencies in the aircraft that affect the performance of the aircraft. The fatigue caused by these loads may occur over multiple instances of operation of the aircraft during the lifetime of the aircraft.

A determination of whether maintenance should be performed on an aircraft may be made by identifying the fatigue life left for the aircraft. In this illustrative example, a fatigue life of the aircraft is the number of stress cycles of a specified character that the aircraft experiences before undesired results occur. Fatigue is directly related to the loads that occur during the operation of the aircraft. The identification of fatigue from wind gusts may be more difficult than desired due to the random nature of wind gust. Therefore, it would be desirable to have a method and apparatus that take into account at least one of the issues discussed above as well as possibly other issues.

SUMMARY

In one illustrative embodiment, a load estimation system comprises a wind load analyzer. The wind load analyzer is configured to receive first information for a group of aircraft parameters recorded by an information recorder during operation of an aircraft. The wind load analyzer is further configured to identify second information about a number of loads on a wing from the first information. The wind load analyzer is still further configured to estimate the number of loads on the wing of the aircraft using the second information.

In another illustrative embodiment, an apparatus comprises a wind load analyzer. The wind load analyzer is configured to receive information for a group of aircraft parameters recorded by an information recorder in an aircraft during operation of the aircraft. The wind load analyzer is further configured to estimate a number of loads on an aerodynamic structure of the aircraft using the information for the group of aircraft parameters.

In yet another illustrative embodiment, a method for identifying loads caused by wind is provided. Information for a group of aircraft parameters recorded by an information recorder is received in an aircraft during operation of the aircraft. A number of loads on an aerodynamic structure of the aircraft is estimated using the information for the group of aircraft parameters.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that identifying loads that may be placed on the wings of an aircraft may be useful in determining when maintenance may be needed for an aircraft.

The illustrative embodiments recognize and take into account that one manner in which information about loads may be identified is through placing sensors in the wings to identify loads that may be applied to the wings of the aircraft. The illustrative embodiments recognize and take into account, however, that the use of sensors increases the cost in manufacturing the aircraft. Additionally, the sensors, wires, and other structures associated with the sensors may increase the weight of the aircraft more than desired. Adding sensors after the aircraft has been used may require more expense and time for upgrading or refurbishing the aircraft.

Further, the illustrative embodiments recognize and take into account that the use of sensors to detect loads on the wings of an aircraft also may increase the maintenance time needed to maintain a desired level of accuracy. For example, more testing may be needed to reach a desired level of accuracy for the data collected by the sensors. Moreover, flying in various wind gust conditions may not be desired for pilots or aircraft.

The illustrative embodiments also recognize and take into account that another approach to determining loads placed on the aircraft during flight may involve creating a model of the aircraft in the conditions encountered by aircraft. These conditions may be identified based on weather information and the altitude at which the aircraft is flown over different locations.

The illustrative embodiments recognize and take into account, however, that these models are statistical models and indicate the probability that the aircraft may have encountered winds and not whether winds were actually encountered during the flight of the aircraft. With this type of approach, more maintenance may occur than desired. This increased maintenance occurs from an inability to identify whether the aircraft actually encountered winds that may generate loads on the wings of the aircraft.

Thus, the illustrative embodiments provide a method and apparatus for identifying loads caused by wind. In one illustrative example, information is received for a group of aircraft parameters recorded by an information recorder in an aircraft during operation of the aircraft. A load on an aerodynamic structure of the aircraft is predicted using information for the aircraft parameters.

Figure 1:
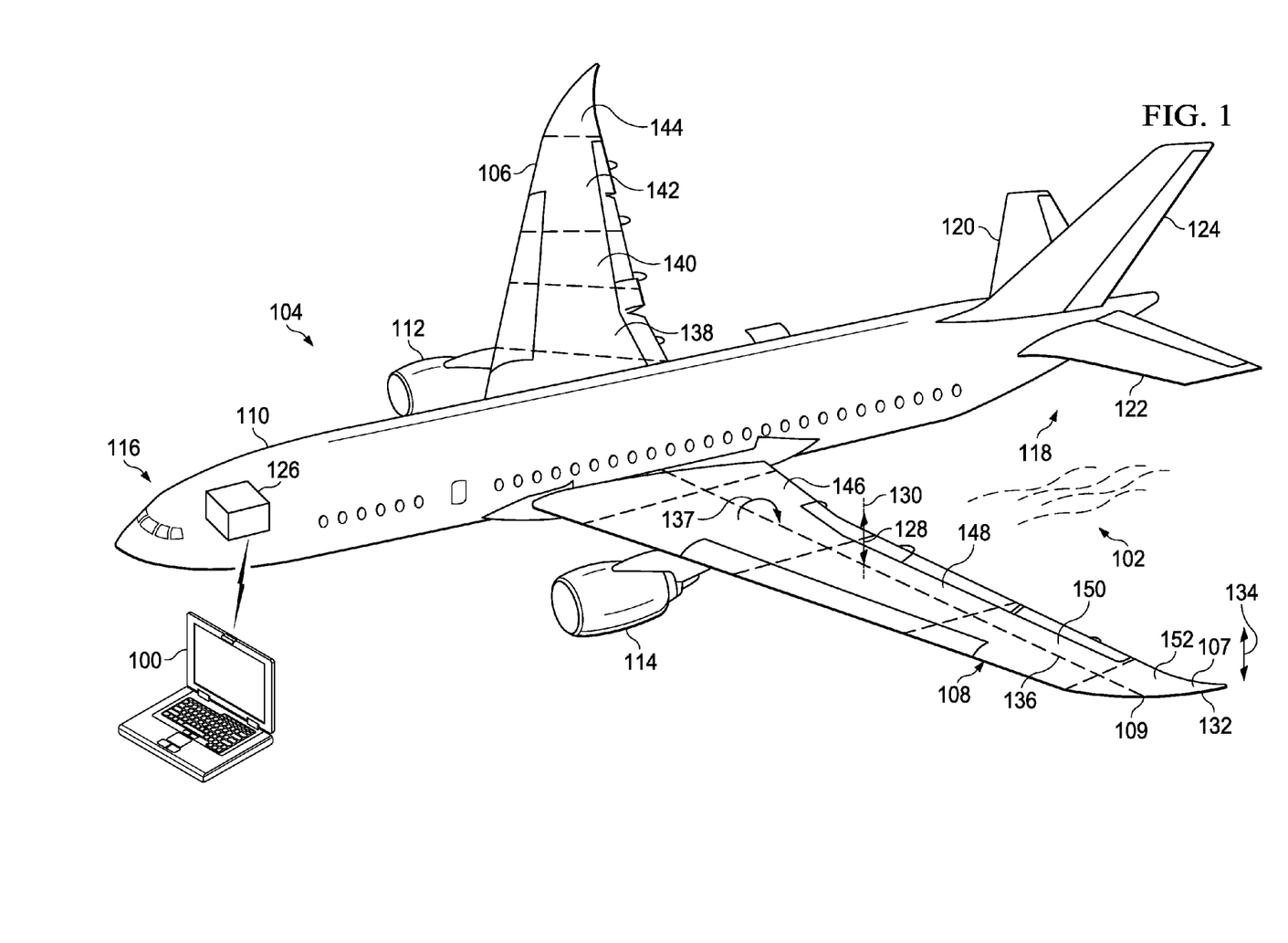
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, computer 100 is configured to estimate of a number of loads caused by wind 102 on aircraft 104. In this illustrative example, "a number of," when used with reference items, means one or more items. For example, a number of loads is one or more loads.

As depicted, aircraft 104 has wing 106 and wing 108 attached to body 110. Aircraft 104 includes engine 112 attached to wing 106 and engine 114 attached to wing 108.

Body 110 has nose section 116 and tail section 118. Horizontal stabilizer 120, horizontal stabilizer 122, and vertical stabilizer 124 are attached to tail section 118 of body 110. Aircraft 104 is an example of an aircraft in which a load estimation system may be implemented to identify a number of loads that may occur on wing 106 and wing 108 in accordance with an illustrative embodiment.

The number of loads on wing 108 may include shear load 128. Shear load 128 is a load that may be applied in the direction of axis 130. Shear load 128 is a total vertical force at a cross section of wing 108.

Other types of loads and more complex loads may occur on wing 108 in response to wind 102. For example, wind 102 on wing 108 may cause a bending movement of wing 108 along the span of wing 108. This bending may cause tip 132 of wing 108 to move in the direction of arrow 134.

In one example, the bending movement may be referred to as a bending moment. A bending moment is a combined effect of upper skin 107 of wing 108 in tension and lower skin 109 of wing 108 in compression. In other words, wind 102 causes tension on upper skin 107 of wing 108, while wind 102 causes compression on lower skin 109 of wing 108. The result is the bending movement of tip 132 of wing 108 in the direction of arrow 134.

In another illustrative example, wind 102 may cause torsional movement of wing 108. Torsional movement is the twisting of wing 108 about axis 136 in the direction of arrow 137 in this depicted example. Torsional movement may be the result of all torsion forces combined acting at a cross section of wing 108.

This type of twisting movement may cause torsion within wing 108. The twisting movement causes a number of loads on wing 108. These types of movement of wing 108 may result in other types of loads in addition to, or in place of, shear load 128.

In the illustrative example, flight recorder 126 in aircraft 104 records information for a group of parameters during the operation of aircraft 104. Flight recorder 126 may be a black box in the illustrative example.

Typically, information from flight recorder 126 may be accessed when an undesired operation of aircraft 104 occurs. An undesired operation of aircraft 104 may include an inadvertent encounter with the ground during flight, a building while taxiing, or other structure during a phase of flight of aircraft 104.

In the illustrative example, the information from flight recorder 126 may be accessed for other purposes such as identifying loads on wing 106 and wing 108. As depicted, the information may be sent to computer 100 after a flight of aircraft 104. The information may be obtained from flight recorder 126 during routine maintenance, while aircraft 104 is at a gate between flights, or at some other time.

As depicted, flight recorder 126 is not configured to record information that directly describes loads that may be applied to wing 106 and wing 108. In other words, information is not received from sensors associated with wing 106 and wing 108, such as strain gauges, accelerometers, or other sensors used to measure loads.

In the illustrative example, the information recorded by flight recorder 126 is sent to computer 100 for analysis to identify number of loads on aircraft 104 that may be caused by wind 102. As depicted, computer 100 may perform pattern recognition or other analysis to identify a correlation of information recorded by flight recorder 126 to loads that occur on wing 106 and wing 108.

Computer 100 is configured to identify loads on wing 106 and wing 108 using information from flight recorder 126. The loads on wing 106 and wing 108 may be at least one of shear load 128 or other loads caused by wind 102.

The identification of the loads performed by computer 100 is an estimate of the loads on wing 106 and wing 108 caused by wind 102. With the estimate of the number of loads that occurred, at least one of maintenance or other operations may be identified for aircraft 104.

The loads on wing 106 and wing 108 may include a load on wing 106 and a load on wing 108. The loads may be a number of loads on individual structures in wing 106 and individual structures in wing 108. In other words, the loads on wing 106 may be comprised of a number of different loads to different parts of wing 106. In a similar fashion, the loads on wing 108 may be comprised of a number of different loads on the different parts of wing 108.

In this illustrative example, the loads may be identified for sections in wing 106 and sections in wing 108. For example, the loads may be identified for section 138, section 140, section 142, and section 144 of wing 106. The loads also may be identified for section 146, section 148, section 150, and section 152 of wing 108. As depicted, these different sections are cross-sections in wing 106 and wing 108.

The illustrative example in FIG. 1 is not meant to limit the manner in which different load estimation systems may be implemented. For example, although aircraft 104 is shown as a commercial aircraft, other illustrative embodiments may be applied to other types of aircraft. For example, computer 100 may be used to estimate loads on wings for military aircraft.

Figure 2:
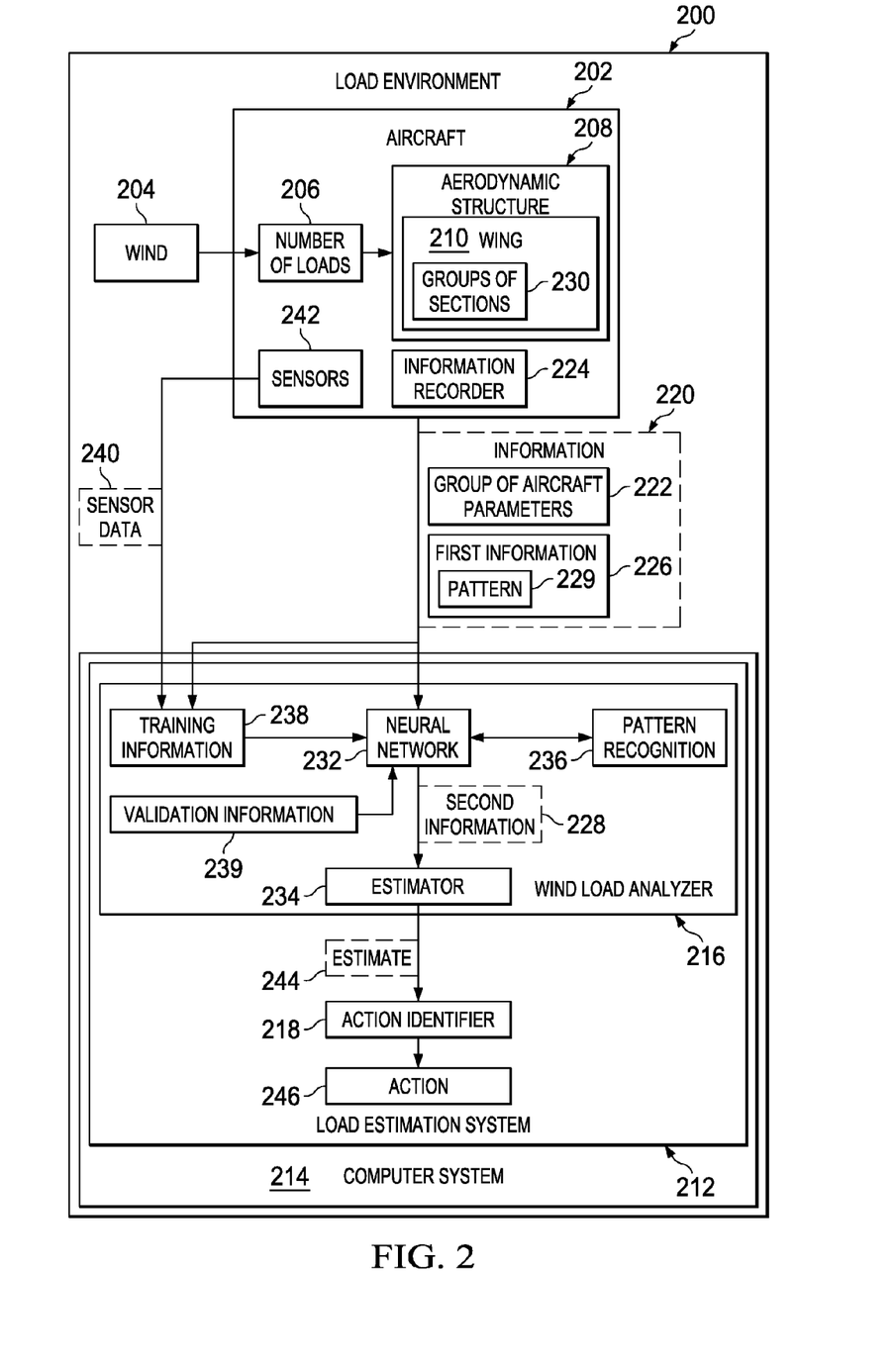
FIG. 2 is an illustration of a block diagram of a load environment in accordance with an illustrative embodiment.

With reference now to FIG. 2, an illustration of a block diagram of a load environment is depicted in accordance with an illustrative embodiment. In this illustrative example, load environment 200 includes aircraft 202. Aircraft 104 in FIG. 1 is an example of a physical implementation for aircraft 202 shown in block form in this figure. Wind 204 may cause number of loads 206 on aircraft 202.

In this illustrative example, wind 204 may cause number of loads 206 on aerodynamic structure 208. As depicted in this particular example, aerodynamic structure 208 takes the form of wing 210.

Load estimation system 212 may estimate number of loads 206 on wing 210. Load estimation system 212 may be implemented in software, hardware, firmware or a combination thereof. When software is used, the operations performed by load estimation system 212 may be implemented in program code configured to run on a processor unit. The hardware may include circuits that operate to perform the operations in load estimation system 212.

In this illustrative example, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, load estimation system 212 may be implemented in computer system 214. Computer system 214 may include one or more computers. When more than one computer is present in computer system 214, those computers may be in communication with each other through a communications medium such as a network.

As depicted, load estimation system 212 includes a number of different components. In this illustrative example, load estimation system 212 comprises wind load analyzer 216 and action identifier 218.

Wind load analyzer 216 in load estimation system 212 is configured to receive information 220 for group of aircraft parameters 222 recorded by information recorder 224 during operation of aircraft 202. Flight recorder 126 in FIG. 1 is one example of an implementation for information recorder 224. Information recorder 224 may be selected from at least one of a flight recorder or a flight management computer. In some examples, information recorder 224 may be selected from one of an engine-indicating and crew-alerting system, an electronic flight bag, or some other suitable device.

Group of aircraft parameters 222 is one or more parameters in the illustrative example. These parameters are recorded by information recorder 224 in aircraft 202. Group of aircraft parameters 222 is not specific to number of loads 206. In other words, group of aircraft parameters 222 may not include parameters used to directly calculate number of loads 206. Additionally, wind load analyzer 216 in load estimation system 212 is configured to estimate number of loads 206 on wing 210 of aircraft 202 using information 220 for group of aircraft parameters 222.

In this illustrative example, information 220 is first information 226. In estimating number of loads 206, wind load analyzer 216 in load estimation system 212 is configured to identify second information 228 about number of loads 206 on aerodynamic structure 208 from first information 226 and estimate number of loads 206 on wing 210 of aircraft 202 using second information 228.

The illustrative embodiments recognize that pattern 229 in first information 226 may be used to estimate number of loads 206 on wing 210. In particular, pattern 229 for values for group of aircraft parameters 222 may be used to estimate number of loads 206 on wing 210. In other words, these values may have pattern 229 with respect to number of loads 206 that occur in response to wind 204. For example, speed, altitude, roll angle, and other values in first information 226 may be correlated to number of loads 206 using pattern 229.

Thus, values for these and other parameters in group of aircraft parameters 222 in first information 226 may have pattern 229 that is present when wind 204 causes number of loads 206 on wing 210. The presence of pattern 229 in first information 226 may allow for identification of second information 228 for number of loads 206.

In the illustrative example, second information 228 may be for group of sections 230 in wing 210 of aircraft 202. Group of sections 230 may be cross-sections of wing 210. In this manner, number of loads 206 may be identified for each of group of sections 230 in wing 210.

In this illustrative example, wind load analyzer 216 includes a number of different components. As depicted, wind load analyzer 216 includes neural network 232 and estimator 234.

As depicted, neural network 232 is an artificial neural network. Neural network 232 is a network of neurons or nodes that is configured to perform at least one of pattern recognition or machine learning. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

Neural network 232 is configured to receive first information 226 and identify second information 228 using first information 226. In particular, neural network 232 may use pattern recognition 236 to identify second information 228 from pattern 229 in first information 226.

In the illustrative example, neural network 232 may be trained to perform pattern recognition 236 using training information 238 and validation information 239. In this illustrative example, training information 238 may include first information 226 recorded by information recorder 224 and sensor data 240 generated during operation of aircraft 202. Sensor data 240 may be generated by sensors 242 for wing 210 of aircraft 202. Sensors 242 may include a load cell, a strain gauge, an accelerometer, and other suitable types of sensors configured to detect number of loads 206.

In this depicted example, validation information 239 may be used to validate the training of neural network 232. In other words, validation information 239 may be used to determine whether neural network 232 generates second information 228 with a desired level of accuracy.

In the illustrative example, validation information 239 may include first information 226 and sensor data 240. After training neural network 232, validation is completed using validation information 239. Neural network 232 may estimate second information 228 such as shear, bending moment, or torsion at group of sections 230 of wing 210 after neural network is fully trained and verified using training information 238 and validation information 239.

Sensors 242 may be associated with wing 210 at or around group of sections 230 in wing 210. When one component is "physically associated" with another component, the association is a physical association in the depicted examples. For example, a first component, such as sensors 242, may be considered to be physically associated with a second component, such as wing 210, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both. In some illustrative examples, the first component may be removeably connected to or temporarily associated with the second component. In either instance, the first component may be configured to be separated from the second component.

In these illustrative examples, sensors 242 may be temporarily associated with wing 210. For example, sensors 242 may be attached to wing 210 during testing, certification, or other operations performed on aircraft 202. In this manner, training information 238 may be generated during testing or other operations of aircraft 202.

Accordingly, the weight and maintenance of sensors 242 with respect to normal operation of aircraft 202 are not present since sensors 242 are only temporarily associated with wing 210 of aircraft 202. Once training information 238 is recorded, sensors 242 may be removed from aircraft 202.

In subsequent flights, the illustrative examples use first information 226 recorded by information recorder 224 instead of information generated by sensors 242.

In these illustrative examples, first information 226 is normally used for other purposes and not selected for identifying number of loads 206. Instead, pattern recognition 236 is performed using neural network 232 to identify second information 228 which may be used to estimate number of loads 206.

As depicted, second information 228 is used to estimate number of loads 206. In particular, estimator 234 is configured to estimate number of loads 206 on wing 210 of aircraft 202 using second information 228. In other words, estimator 234 generates estimate 244 of number of loads 206. For example, estimator 234 may be configured to perform calculations using algorithms to identify estimate 244 of number of loads 206 from second information 228.

In the illustrative example, estimator 234 sends estimate 244 for number of loads 206 to action identifier 218. With estimate 244 of number of loads 206, action identifier 218 is configured to identify action 246 with respect to aircraft 202. Action 246 may take various forms. For example, action 246 may be selected from one of maintenance, an alert, a warning, and other suitable types of actions.

In this manner, estimating the number of loads 206 may be used to more accurately determine when maintenance or other actions may be needed with respect to aircraft 202. With the use of load estimation system 212, the inaccuracies with models that use weather information to guess as to whether wind 204 may have been encountered by aircraft 202 may be reduced.

Figure 3:
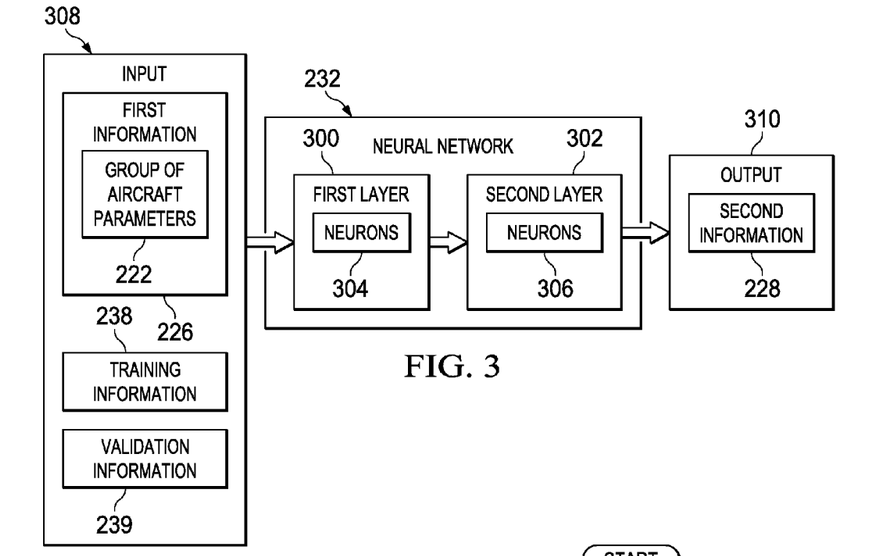
FIG. 3 is an illustration of a block diagram of a neural network in accordance with an illustrative embodiment.

With reference now to FIG. 3, an illustration of a block diagram of a neural network is depicted in accordance with an illustrative embodiment. One manner in which neural network 232 in FIG. 1 may be implemented is shown in this figure.

As depicted, neural network 232 includes first layer 300 and second layer 302. First layer 300 is comprised of neurons 304. Second layer 302 is comprised of neurons 306.

In this illustrative example, first layer 300 is a sigmoid layer. In particular, first layer 300 may implement a sigmoid function in neurons 304.

As depicted, second layer 302 may be a linear layer. A linear layer may be used when an entire range of numbers is desirable for the output of neural network 232. In other words, a linear layer may be used to output a range.

In this illustrative example, neural network 232 receives input 308 and generates output 310. Input 308 may be first information 226 and output 310 may be second information 228. Input 308 also may include training information 238 when training neural network 232.

As depicted, group of aircraft parameters 222 in first information 226 include one or more different parameters. For example, group of aircraft parameters 222 may be selected from at least one of gross weight, aircraft vertical acceleration at the center of gravity of aircraft 202, aircraft lateral acceleration at the center of gravity of aircraft 202, roll angle about the longitudinal axis for aircraft 202, roll rate, air speed, Mach number, altitude, wing flap angle, angle of attack, sideslip angle, or other suitable parameters about aircraft 202.

In the illustrative example, second information 228 may include one or more different parameters. As depicted, second information 228 is selected from at least one of shear, bending moment, torsion, or other suitable parameters. These parameters and second information 228 may include parameters for selecting group of sections 230 for wing 210.

As depicted, neural network 232 uses pattern recognition 236 to identify pattern 229 in first information 226 to generate second information 228 as shown in FIG. 2. In other words, neural network 232 identifies pattern 229 in first information 226 corresponding to the particular values in second information 228.

The ability to identify pattern 229 and generate second information 228 may be performed using training information 238. In other words, training information 238 may be sent to neural network 232. This training information includes first information 226 and sensor data 240 in FIG. 2. Validation information 239 is then used to validate the training of neural network 232. In this manner, neural network 232 may learn to perform pattern recognition 236.

The illustration of load environment 200 and the different components in load environment 200 in FIG. 2 and FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, aerodynamic structure 208 may take other forms other than wing 210. For example, aerodynamic structure 208 may be selected from one of a horizontal stabilizer, a vertical stabilizer, a control surface, a rudder, and a flap.

In yet another example, neural network 232 may include other number of layers of neurons. For example, one layer, three layers, seven layers, or some other number of layers of neurons may be used in neural network 232 in different illustrative examples. Also, the different parameters in input 308 and output 310 may be used in addition to or in place of the ones described in FIG. 3.

Further, other mechanisms may be used other than neural network 232 to identify second information 228. For example, any hardware, software, or combination thereof may be used that is configured to identify second information 228 from first information 226. For example, any system configured to perform pattern recognition 236 may be used in addition to, or in place of, neural network 232.

In another illustrative example, pattern recognition 236 may be performed by a multi-objective optimization model using meta-heuristic methods. For example, pattern recognition 236 may be performed using genetic algorithms, a Tabu search, simulated annealing, and other suitable types of meta-heuristic methods.

Figure 4:
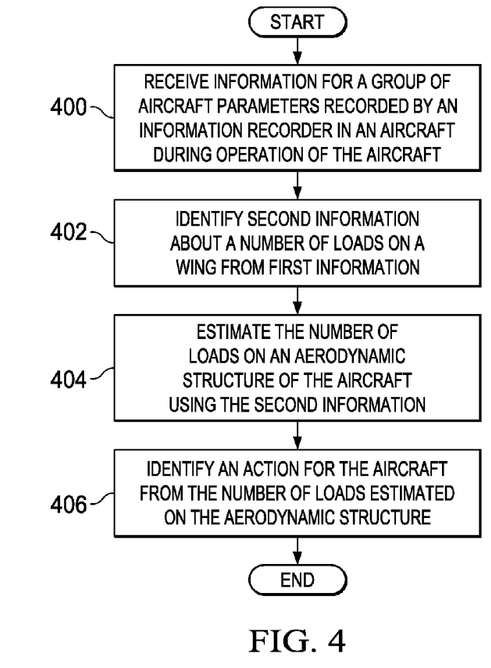
FIG. 4 is an illustration of a flowchart of a process for identifying loads caused by wind in accordance with an illustrative embodiment.

Turning now to FIG. 4, an illustration of a flowchart of a process for identifying loads caused by wind is depicted in accordance with an illustrative embodiment. The process illustrated FIG. 4 may be implemented in load environment 200 in FIG. 2. One or more of the different operations may be implemented using one or more components in load estimation system 212.

The process begins by receiving information for a group of aircraft parameters recorded by an information recorder in an aircraft during operation of the aircraft (operation 400). The process then identifies second information about a number of loads on a wing from first information (operation 402). The process estimates the number of loads on an aerodynamic structure of the aircraft using the second information (operation 404).

Next, the process identifies an action for the aircraft from the number of loads estimated on the aerodynamic structure (operation 406), with the process terminating thereafter. In the illustrative example, the action may be maintenance for the aircraft.

Figure 5:
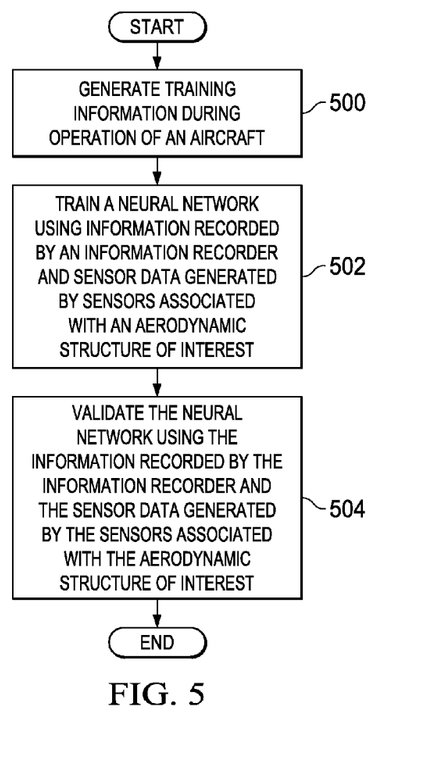
FIG. 5 is an illustration of a flowchart of a process for training a neural network in accordance with an illustrative embodiment.

With reference next to FIG. 5, an illustration of a flowchart of a process for training a neural network is depicted in accordance with an illustrative embodiment. The process illustrated in FIG. 5 may be implemented in load environment 200 to train neural network 232 in FIG. 2.

The process begins by generating training information during operation of an aircraft (operation 500). In this illustrative example, the training information may include information recorded by an information recorder in the aircraft and sensor data generated by sensors associated with an aerodynamic structure of interest. The information recorded by the information recorder and the sensor data may be generated during flight of the aircraft.

During flight of the aircraft, the aircraft may encounter wind that cause loads on an aerodynamic structure such as a wing. The information in the sensor data during these events may be used to train the neural network.

In addition, pattern recognition also may be used to identify when loads are not applied to the aerodynamic structure. The information and the sensor data also may be generated while the aircraft is on the ground and encounters wind that generates a load on the aerodynamic structure.

The process then trains a neural network using information recorded by an information recorder and sensor data generated by sensors associated with an aerodynamic structure of interest (operation 502). Next, the process validates the neural network using the information recorded by the information recorder and the sensor data generated by the sensors associated with the aerodynamic structure of interest (operation 504), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 6:
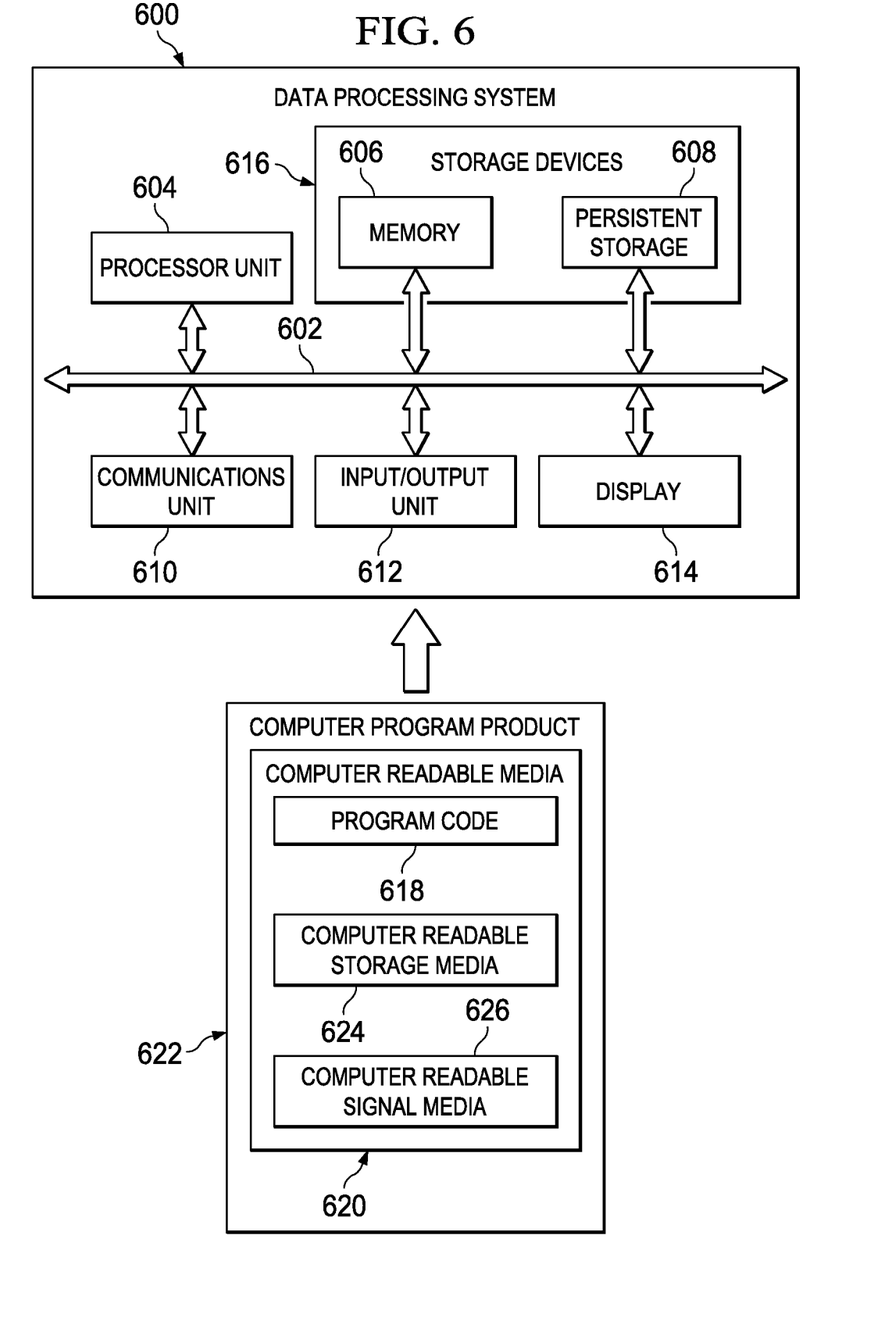
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement computer system 214 in FIG. 2. In this illustrative example, data processing system 600 includes communications framework 602, which provides communications between processor unit 604, memory 606, persistent storage 608, communications unit 610, input/ output (I/O) unit 612, and display 614. In this example, communication framework may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626. In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

Figure 7:
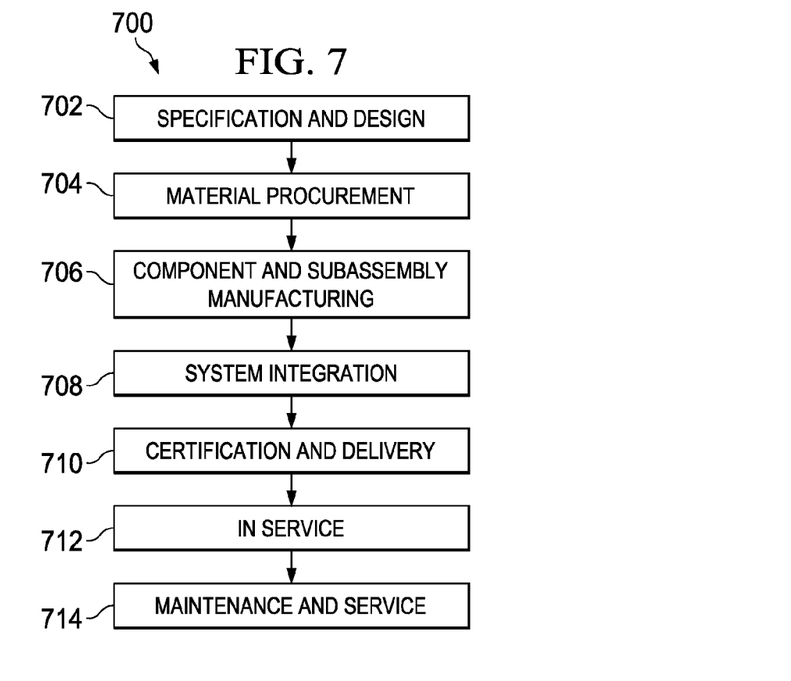
FIG. 7 is an illustration of a block diagram of an aircraft manufacturing and service method.
Figure 8:
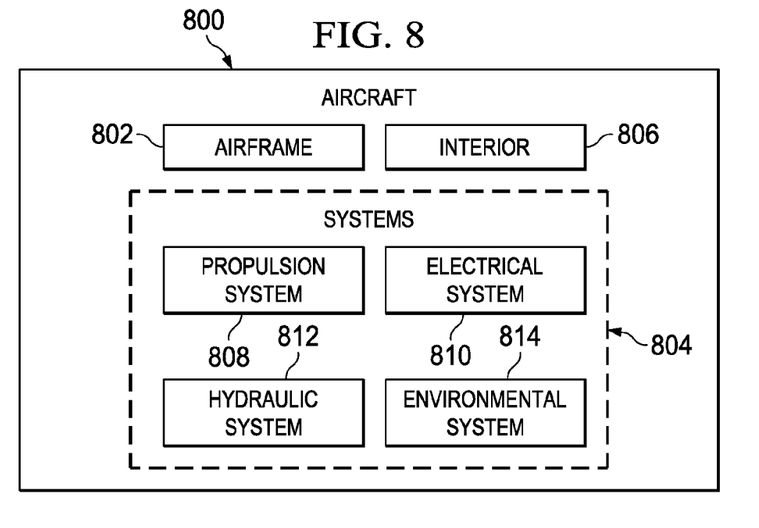
FIG. 8 is an illustration of a block diagram of an aircraft in which an illustrative embodiment may be implemented.

Illustrative embodiments of the disclosure may be described in the context of aircraft manufacturing and service method 700 as shown in FIG. 7 and aircraft 800 as shown in FIG. 8. Turning first to FIG. 7, an illustration of a block diagram of an aircraft manufacturing and service method is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 in FIG. 8 takes place. Thereafter, aircraft 800 in FIG. 8 may go through certification and delivery 710 in order to be placed in service 712. While in service 712 by a customer, aircraft 800 in FIG. 8 is scheduled for routine maintenance and service 714, which may include modification, reconfiguration, refurbishment, and other maintenance or service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of a block diagram of an aircraft is depicted in which an illustrative embodiment may be implemented. In this example, aircraft 800 is produced by aircraft manufacturing and service method 700 in FIG. 7 and may include airframe 802 with plurality of systems 804 and interior 806. Examples of systems 804 include one or more of propulsion system 808, electrical system 810, hydraulic system 812, and environmental system 814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 700 in FIG. 7. For example, training information 238 may be generated during certification and delivery 710 for use in training neural network 232 in FIG. 2. Information 220 may be generated while aircraft 800 is in service 712. Information 220 may be analyzed to estimate number of loads 206 while aircraft 202 is in service 712, during maintenance and service 714, and at other times. The use of a number of the different illustrative embodiments may substantially increase the accuracy at which maintenance may be performed on aircraft 800. Further, with the use of an illustrative embodiment, the availability of aircraft 800 may be increased as compared to using other techniques for identifying loads on aircraft while reducing the weight, expense, or both for aircraft 800.

Thus, the illustrative embodiments provide a method and apparatus for identifying number of loads 206 caused by wind 204 over time. In one illustrative example, information 220 is received for group of aircraft parameters 222 recorded by information recorder 224 in aircraft 202 during operation of aircraft 202. A load on aerodynamic structure 208 of aircraft 202 is predicted using information 220 for group of aircraft parameters 222.

With the use of an illustrative embodiment, unnecessary maintenance for aircraft 202 may be reduced. Additionally, load estimation system 212 may provide accurate data about fatigue and inconsistencies caused by wind 204 and other loads placed on aerodynamic structure 208 in aircraft 202. Estimate 244 may be generated without data having to be collected using sensors 242 during normal operation of aircraft 202. As a result, cost and time for manufacturing aircraft 202 may be reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A load estimation system comprising:
    an information recorder configured to record first information during operation of an aircraft;
    sensors configured to generate sensor data;
    a wind load analyzer, having a processor configured to:
        receive the first information for a group of aircraft parameters recorded by the information recorder,
        use the first information and the sensor data to generate training information,
        identify, using a neural network, second information about a number of loads on a wing of the aircraft, wherein the neural network is trained using the training information, and
        estimate a load in the number of loads caused by wind on the wing of the aircraft using the second information.

2. The load estimation system of claim 1 further comprising:
    an action identifier configured to identify maintenance for the aircraft from the number of loads estimated for the wing by the wind load analyzer.

3. The load estimation system of claim 1, wherein the wind load analyzer further comprises:
    an estimator configured to estimate the number of loads on the wing of the aircraft using the second information.

4. The load estimation system of claim 1, wherein the training information is generated during testing of the aircraft.

5. The load estimation system of claim 1, wherein the second information is selected from at least one of shear, bending moment, or torsion.

6. The load estimation system of claim 1, wherein the second information is for a group of sections in the wing of the aircraft.

7. The load estimation system of claim 1, wherein the group of aircraft parameters is selected from at least one of gross weight, aircraft vertical acceleration, aircraft lateral acceleration, roll angle, roll rate, air speed, Mach number, altitude, wing flap angle, angle of attack, or sideslip angle.

8. The load estimation system of claim 1, wherein the information recorder is selected from at least one of a flight recorder or a flight management computer.

9. An apparatus comprising:
    a wind load analyzer configured to:
        receive first information for a group of aircraft parameters recorded by an information recorder in an aircraft during operation of the aircraft;
        receive sensor data from sensors on an aerodynamic structure of the aircraft;
        generate training information using the first information and the sensor data;
        identify second information about a number of loads on the aerodynamic structure of the aircraft caused by wind using a neural network trained with the training information; and
        estimate a load in the number of loads caused by the wind.

10. The apparatus of claim 9, wherein the wind load analyzer is configured to estimate the number of loads on the aerodynamic structure of the aircraft using the second information.

11. The apparatus of claim 9 further comprising:
    an action identifier configured to identify maintenance for the aircraft from the number of loads estimated for the aerodynamic structure by the wind load analyzer.

12. The apparatus of claim 9, wherein the wind load analyzer further comprises:
    an estimator configured to estimate the number of loads on the aerodynamic structure of the aircraft using the second information.

13. The apparatus of claim 9, wherein the aerodynamic structure is selected from one of a wing, a horizontal stabilizer, a vertical stabilizer, a control surface, a rudder, and a flap.

14. A method for identifying loads caused by wind, the method comprising:
    receiving first information for a group of aircraft parameters recorded by an information recorder in an aircraft during operation of the aircraft;
    receiving sensor data from sensors on an aerodynamic structure of the aircraft;
    generating training data using the first information and the sensor data;
    identifying, using a neural network, second information about a number of loads on the aerodynamic structure, wherein the neural network is trained using the training information; and
    estimating a load in the number of loads on the aerodynamic structure of the aircraft caused by wind.

15. The method of claim 14, further comprises:
    identifying second information about the number of loads on a wing from the first information; and estimating the number of loads on the aerodynamic structure of the aircraft using the second information, wherein the estimating is performed by the neural network.

16. The method of claim 14 further comprising:
identifying an action for the aircraft from the number of loads estimated for a wing.

17. The method of claim 14, wherein the aerodynamic structure is selected from one of a wing, a horizontal stabilizer, a vertical stabilizer, a control surface, a rudder, and a flap.

* * * * *